June 16, 1942. B. P. POND 2,286,929
LIQUID LEVEL RESPONSIVE DEVICE
Filed Feb. 25, 1939 2 Sheets-Sheet 2

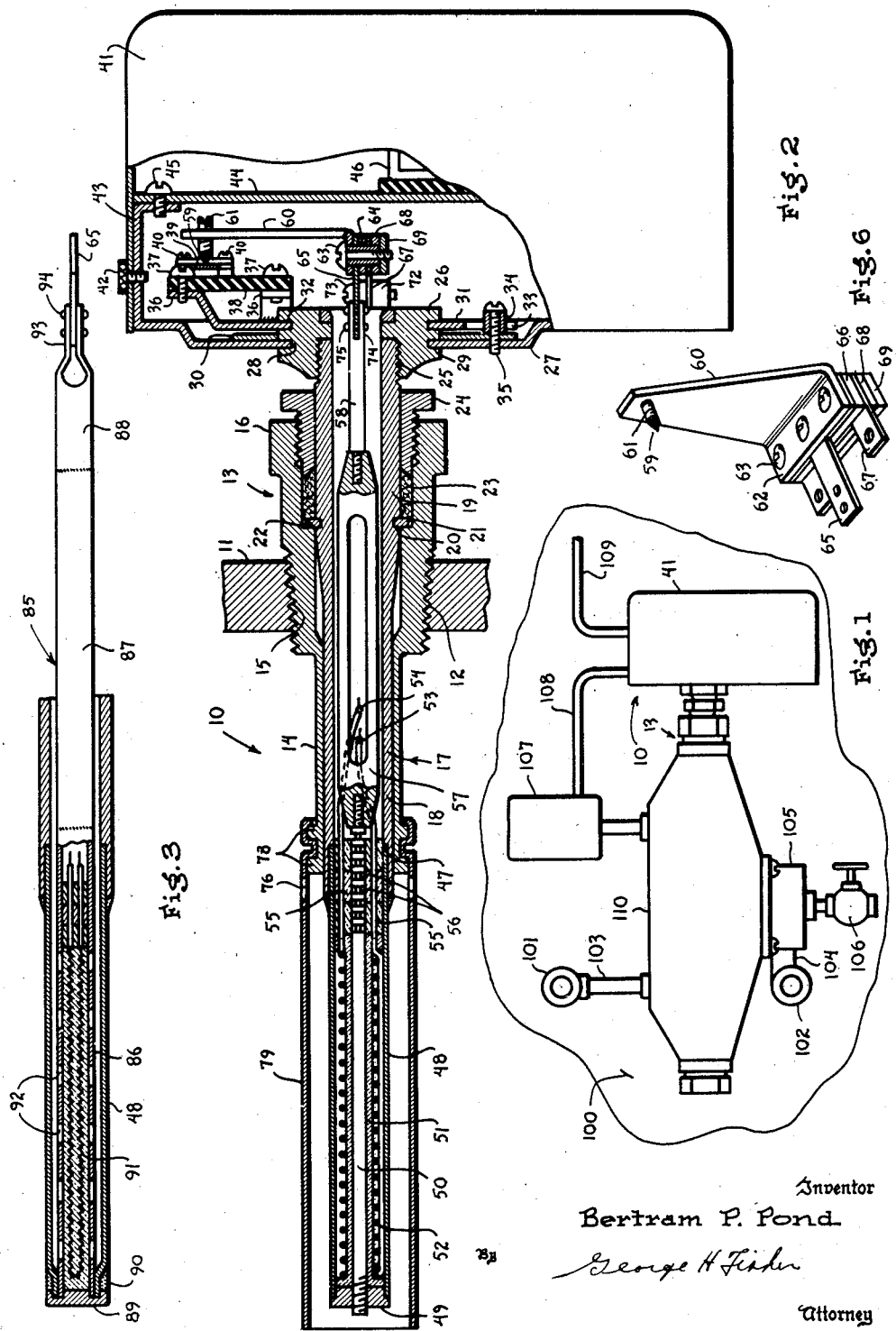

Inventor
Bertram P. Pond
By George H Fisher
Attorney

Patented June 16, 1942

2,286,929

UNITED STATES PATENT OFFICE 2,286,929

LIQUID LEVEL RESPONSIVE DEVICE

Bertram P. Pond, Minneapolis, Minn., assignor to Minneapolis-Honeywell Regulator Company, Minneapolis, Minn., a corporation of Delaware Application February 25, 1939, Serial No. 258,555

10 Claims. (Cl. 200—122)

One of the objects of the present invention is to improve the construction of liquid level responsive devices of the heat dissipation type.

Another object is to provide a device of the rod and tube type in which the tube is heated and is in contact with the liquid so that the heat is carried away rapidly to maintain a comparatively low tube temperature. When the liquid level drops below that of the tube the heat cannot be carried away so rapidly and the temperature of the tube rises. The resultant expansion operates a signal or a control of some sort.

A further object of the invention is to compensate the thermal element for variations in the temperature of the liquid or gas with which it is in contact so that the control will be effected in response to liquid level alone.

A further object is to operate the control through a relay which is controlled by a snap switch operated by the thermal element and to provide the snap switch with a resiliently mounted holding contact so as to eliminate the hazard of relay chatter when the switch is just about ready to snap and the contact pressure is substantially zero.

A further object is to wire the relay winding and snap switch in series with the heater for the thermal element and to provide a balancing resistance to be thrown in series with the heater when the snap switch is open so that the current flow through the heater will be maintained at a value at least sufficient to hold the switch in its operated position.

A still further object of the invention is to mount the device in a container outside of the boiler and connected thereto in the manner of a gauge glass.

Another object is to make the rod of the rod and tube thermostat of hollow form so that the heater used may be of the usual cartridge type. In this case holes may be cut in the rod so that the heat from the heater may be radiated directly to the temperature sensitive tube.

Still another object of the invention is to wire the control so that a signal, a heater for the boiler, or a feed water control, or any combination of these may be operated by the device.

Figure 4:
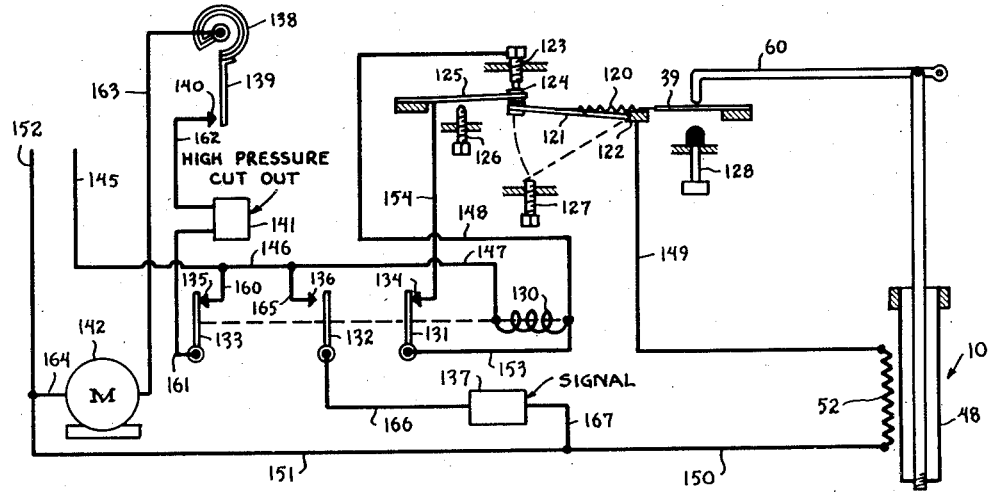
Figure 5:
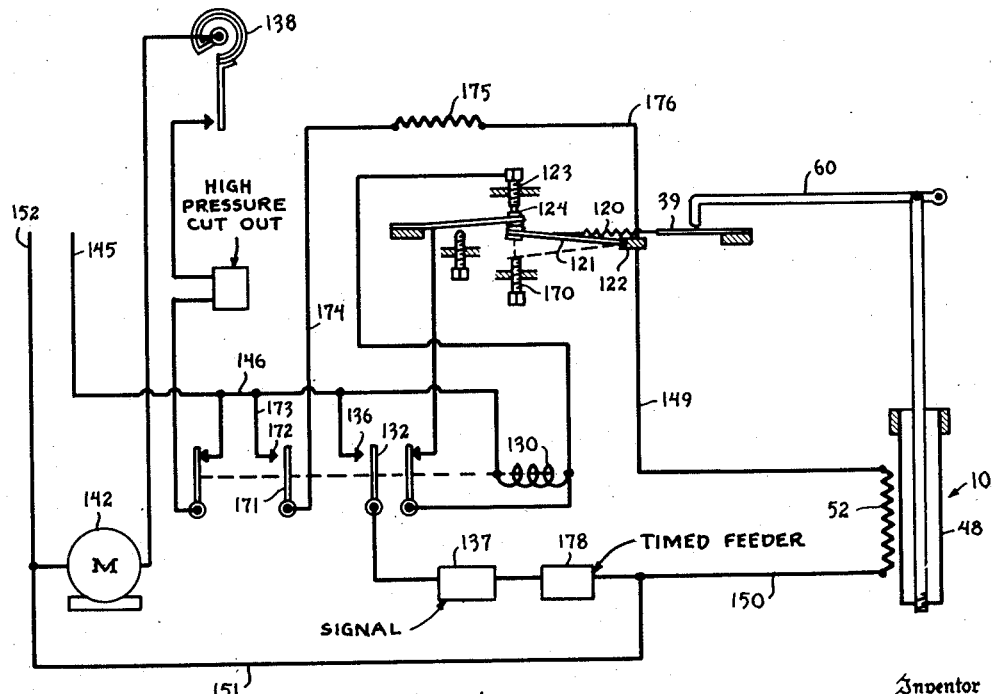

These and other objects will become readily apparent to those skilled in the art as the following specification is read in the light of the accompanying drawings, in which Figure 1 is a general view showing the manner in which the device of my invention may be mounted on a boiler, Figure 2 is a side view, partly in section, of my liquid level responsive device, Figure 3 is a view, partly in section, showing a slight modification of the structure shown in Figure 2, Figure 4 shows the schematic wiring diagram used where a manual reset is desired, Figure 5 shows the schematic wiring diagram used with the automatic return, and Figure 6 shows a perspective view of the lever for actuating the snap switch.

Referring first to Figure 2, the reference numeral 11 indicates a portion of the side wall of a container which houses a liquid whose level may fall below and rise above a predetermined level. At this predetermined level in the wall 11 a tapped hole 12 is cut for the purpose of receiving a mounting member generally indicated at 13. This member may be made of any suitable material and is provided with a narrow portion 14, a wider screw threaded portion 15, and a head 16 of hexagonal form so that it may be rotated by means of a wrench. The mounting member 13 is screwed into the hole 12 by means of the threads 15 and then tightened. Located within the mounting member 13 is a supporting member of nonexpansible material generally indicated at 17, and which has a narrow portion 18 which fits snugly within the narrow portion of the mounting member and a wider portion 19 within the head 16 of the mounting member. The supporting member 17 is provided with a circumferential groove 20 in which is placed a suitable snap ring 21. The supporting member 17 is slid longitudinally within the mounting member 13 until the ring 21 abuts the shoulder 22 within the head of the mounting member and the packing material 23 is then tightened by means of the packing nut 24 which has a screw thread engagement with the inside of the head 16. The end of the supporting member 17 is provided with screw threads 25 on which screws a hexagonal nut 26 which may also be made of a nonexpansible material. A base plate 27 is provided with a hexagonal hole 28 by means of which it is placed over the nut 26 until it registers with a groove 29 in the nut 26 and the two are securely held together by rotating the plate 27 through an angle of 30°. A locking plate 30 is then placed over the nut 26 and then a second supporting plate 31 which registers with a second groove 32 in the nut 26 is rotated through an angle of 30° to fix it with relation to the nut in the same manner as the plate 27. The plate 31 is provided with a slot 33 in which is mounted a spacer 34 and a screw 35, the screw passing also through holes in the locking plate 31 and the plate 27 to lock the entire structure together and prevent their rotation with respect to the nut 26. The locking plate 30 has a hexagonal hole which exactly fits the nut 26 and hence it is impossible to rotate this plate with respect to the nut.

The plate 31 is provided with ears 36 to which is attached by means of screws 37 a switch panel 38. The panel 38 supports a snap switch of the over-center type, one element of which is indicated at 39 and supported by means of the screws 40.

The supporting plate 27 is provided with horizontally and vertically extending portions 43 on which is mounted a panel 44 by means of the screw 45. The panel 44 supports a relay, part of which is shown at 46. The relay is merely conventional and hence is not shown in detail. A cover 41 is mounted on the horizontally extending portion 43 of the plate 27 by means of screw 42.

Inserted within the other end of the supporting member 17 and seating against the internal shoulder 47 thereof is a tube 48 of suitable expansible material. This tube is closed at its other end by means of a threaded cap 49 in which one end of a relatively non-expansible rod 50 is adjustably positioned and sealed. Slidably mounted over the rod 50 is a bobbin 51 of insulating material about which is wound a coil of resistance wire 52 to form an electrical heater for heating the tube 48. The heater 52 is provided with a pair of lead wires 53 and 54 which are protected by means of insulating beads 55 through which the wires extend. The opposite end of the rod 50 is screw threaded into one end of a force transmitting element 57 of a relatively expansible material and the opposite end of this element is in turn screw-threaded to another force transmitting element 58 of relatively non-expansible material.

As shown more clearly in Figure 6, a lever 60 is provided for operating the snap switch and a contacting element 61 having an insulated tip 59 is adjustably secured in the free end of the lever for making contact with the switch mechanism. The lower end 62 of the lever 60 is turned in at an angle of 90° with respect to the rest of the lever and is adapted to carry a series of screws 63 and spacers 64 (Figure 2). Mounted on the spacers 64 is a first flexible reed 65, a spacing washer 66, a second U-shaped flexible reed 67, a second spacing washer 68, and a lock plate 69 which has screw-threaded engagement with the screws 63 which lock the above mentioned parts in assembled relation.

The nut 26 is provided with a pair of ears, one of which is shown at 72 in Figure 2, to which the two legs of the U-shaped reed 67 are fastened by means of screws 73. One end of the rod 58 is bifurcated as shown at 74 and the reed 65 is inserted in the slot so formed and riveted thereto as shown at 75.

It will be seen that as the reed 65 is moved toward the right by rod 58 as shown in Figure 2, that the reed 67 will be caused to flex permitting rotation of the lever 60 in a clockwise direction and as the rod 58 moves toward the left the lever will be pulled in a counter-clockwise direction, this movement being permitted by the flexibility of the two reeds.

Attention is called to the fact that the switch panel 38 is mounted independently of the plate 27 forming the rear of the switch casing. Therefore the casing and relay panel may be bent and twisted without changing the relationship between the switch element 39 and the lever 60.

The supporting member 14 is provided with a pair of circumferential flanges 78 by means of which a splash guard 79 is attached. This splash guard surrounds the expansible tube 48 and protects it from being splashed due to agitation of the liquid within the container 11. It will be noted that holes 76 in the inner end of the splash guard permit the free circulation of liquid around tube 48.

In view of the above description of the various parts, the operation of the device should now be clear. Electric current normally flows through the heating element 52 causing it to heat the tube 48 and when the liquid level is above that of the tube the liquid will be in contact therewith and will dissipate the heat therefrom at a relatively rapid rate which will maintain the temperature of the tube at a value which will be in the neighborhood of the temperature of the liquid. Under these conditions the tube will be in its relatively contracted position and the rod 58 will be moved toward the right where the lever 60 will be out of contact with the switching mechanism. As the level of the liquid drops below the tube 48 it will expose the tube and the gas above the liquid will be unable to dissipate the heat from the tube at as rapid a rate as the liquid and therefore the temperature of the tube will increase causing it to expand. This expansion will pull the rod 58 toward the left rocking the lever 60 in a counter-clockwise direction and causing it to actuate the switching mechanism.

It will be seen that as the tube 48 is in contact with the liquid within the container 11 that its temperature will vary as the temperature of the liquid which would normally affect the operation of the switching mechanism. This is an undesirable function and for this reason means have been provided in this device for compensating the tube 48 for variations in temperature surrounding the device. This temperature compensation is accomplished by the member 57 which is of relatively expansible material and it is located within the supporting member 17 which is composed of relatively non-expansible material. Therefore as the temperature of the liquid increases the tube 48 will be caused to expand, but this increase in temperature will be conveyed to the member 57 which in turn will expand relatively to the supporting member 17. The expansion of the tube 48 will cause a movement of the rod 58 toward the left and the expansion of the member 57 will cause a movement of the rod 58 toward the right and the material and size of member 57 have been so chosen that on variations in ambient temperature the expansion of these two elements will exactly balance out so that the rod 58 will remain stationary and not move the switch actuating lever 60. Therefore, as a result, the lever 60 is moved only in response to the variations in temperature in the tube 48 caused by the changes in the rate of heat dissipation from the tube which is produced by the liquid alternately surrounding and exposing the tube. The beads 55 and the grooves 56 in member 50 tend to prevent the conduction of heat from the heater 52 and rod 50 to the expansible member 57. Splash guard 79 also serves to aid in the dissipation of any heat which may be conducted from tube 48 to members 17 and 14.

Figure 3 discloses a slight modification in the construction of the rod and tube as shown in Figure 2. The tube 48 remains substantially the same but in this case the rod is itself in the form of a tubular element as indicated generally at 85. The element 85 is originally in the form of a sheet which is welded together in three separate pieces. The first piece 86 is of a relatively non-expansible material such as invar, and the second piece is of a relatively expansible material such as a chromium nickel alloy, and the third piece 88 is again of a relatively non-expansible material such as invar. This sheet is then rolled into the form of a tube and this tube is inserted within the tube 48 and connected thereto. Cap 89 seals the open ends of the tubes as shown at 90.

The main advantage of this construction is that the usual cartridge type of electric heater 91 may be inserted within the tube 85 in order to heat the tube 48. In order to provide for the heat from the heater 91 being radiated to the tube 48, the part 86 of the tube 85 is provided with a series of holes 92. The end of the portion 88 has a pair of inwardly extending ears 93 to which the reed 65 is riveted as shown at 94. The device is otherwise the same as shown in Figure 2. It will be clear that the expansible material 87 compensates tubes 48 for variations in ambient temperatures in the same manner in which the member 57 does.

In Figure 1 there is shown one way in which this device may be mounted on a boiler 100. The boiler is provided with a pair of pipes 101 and 102 which are connected above and below the normal water line in the same manner as the connections for a gauge glass. A container 110 is supported from these pipes and connected to the interior of the boiler by means of pipes 103 and 104. This container is provided with a sump 105 and a blow-off valve 106. Connected horizontally into one end of the container 110 is my liquid level responsive device shown generally at 10. A high pressure cut-out may be provided on the container 110 as shown at 107 and electrical conduits 108 and 109 provide for the proper wiring.

It is pointed out that this device may be mounted in some other position than horizontal. The response will not be as critical as in the horizontal mounting but will give a response proportional to the liquid level. The switch may then be adjusted to be actuated at various different liquid levels along the length of tube 48.

The liquid level responsive device of the present invention may be used to operate a signal when the liquid level falls below a predetermined point or if it is applied to a boiler it may act to shut off the heat supplying means for the boiler, or if desired it may be made to control a device for reestablishing the liquid level. Where it is applied to a boiler and operates to cut off the heat supply to the boiler when the water level within the boiler drops below a predetermined value, it will probably be desired that the switch operated by the liquid level responsive device be of the non-return type requiring a manual reset. A control circuit for such a system has been diagrammatically illustrated in Figure 4.

The liquid level responsive device has been diagrammatically illustrated at 10 as has the switch actuating lever 60 and the leaf spring 39 against which the lever 60 bears. The leaf spring 39 is adapted to operate any type of snap action switch such as the over-center spring 120 and the contact carrying toggle 121 which engages the stationary support 122 by means of knife edges. Indicated at 123 is an adjustably mounted stationary contact with which a holding contact 124 cooperates, the latter contact being mounted on the resilient blade 125 which is biased into engagement with the adjustable stop 126 at which time it will be separated from the contact 123. As the lever 60 presses down on the leaf spring 39 the spring 120 will be carried over-center with respect to the support 122 and the toggle 121 will be snapped into engagement with an adjustable stop 127. At this time the force exerted by the spring 120 tending to hold the toggle 121 in engagement with the stop 127 is too great to be overcome by the resilience of the blade 39 so that the switch will remain in this position even though the lever 60 is withdrawn from engagement with the leaf spring 39. A manual reset button 128 has been provided for manually engaging the leaf spring 39 to return this switch to its closed position.

Indicated at 130 is a relay winding which controls the positions of the switch arms 131, 132, and 133. The arms 131 and 133 cooperate with "in" contacts 134 and 135 and the arm 132 cooperates with the "out" contact 136. In series with the switch arm 132 is some form of signalling device 137 which may be an electric light or a bell of some sort.

Indicated at 138 is a condition responsive element which is adapted to respond to some condition produced by the boiler and it may take the form of a space thermostat, or a boiler thermostat, or any other type of controlling device. The element 138 is adapted to move a switch arm 139 into and out of engagement with the stationary contact 140. In series with the element 138 is a safety device 141 such as a high pressure cut-out and a motor 142 which controls the supply of heat to the boiler.

When the level of the liquid in the boiler is above that of the liquid level responsive device 10 and the tube 48 will be relatively cool and in its contracted position, at which time the lever 60 will be withdrawn from engagement with the leaf spring 39 and the switch contacts will be closed. At this time the relay 130 and the heater 52 will be energized by the following circuit: line wire 145, conductors 146 and 147, relay winding 130, conductor 148, stationary contact 123, contact 124, contact arm 121, 122, conductor 149, heater 52, and conductors 150 and 151 back to the other line wire 152. The energization of the relay 130 causes the closure of the switch arm 131 and its contact 134 which sets up a holding circuit for the relay 130 through the holding contact 124 independently of the stationary contact 123. This holding circuit is as follows: conductor 147, relay winding 130, conductor 153, switch arm 131, contact 134, conductor 154, resilient arm 125, contact 124, and toggle arm 121. The reason for this holding circuit is that when the tube 48 responds to low water and causes the lever 60 to engage the leaf spring 39 there will be a point where the switch is just about ready to snap and the pressure between the contacts 123 and 124 will be practically zero. At this time in the absence of the holding circuit a slight vibration would cause these contacts to chatter which would result in their burning and also cause them to produce an undesirable intermittent operation of the relay 130. With the holding contact 124 the circuit through the relay will remain established through the contacts 124 and the toggle arm 121 and this circuit will not be broken until after the toggle arm has moved through a portion of its travel at which time the arm 121 will break cleanly with contact 124 after the arm 125 has engaged the stop 126. It is obvious that after toggle arm 121 has once separated from contact 124 that relay 130 will be denergized and cannot be reenergized until the contacts 123 and 124 are reclosed by toggle arm 121.

Energization of the relay 130 causes arm 133 to engage stationary contact 135 which is in series with the motor 142. At this time, assuming that the high pressure cut-out 141 is closed, the motor 142 is under the command of the condition responsive device 138 so that each time there is a demand for heat the following circuit is closed through the motor 142: line wire 145, conductor 160, contact 135, switch arm 133, conductor 161, high pressure cut-out 141, conductor 162, contact 140, switch arm 139, condition responsive element 138, conductor 163, motor 142, and conductor 164 back to the other supply line 152.

Under normal conditions therefore the condition responsive device will energize and deenergize the motor 142 in accordance with the demand for heat. In the event that the water level in the boiler becomes too low and exposes the tube 48, it will expand and cause the lever 60 to snap the switch to open position. This deenergizes the relay winding 130 causing the switch arms 131 and 133 to disengage contacts 134 and 135, respectively, and the switch arm 132 to engage the stationary contact 136. The dropping out of switch arm 133 breaks the circuit to the motor 142 making it impossible to supply heat to the boiler and as arm 132 engages contact 136 the following circuit is established to the signalling device 137: line wire 145, conductors 146 and 165, contact 136, switch arm 132, conductor 166, signalling device 137 and conductors 167 and 151 back to the other supply line 152. This circuit energizes the signal and calls attention to the fact that the water in the boiler is low and the heating device has been shut down. It will be noted also that the circuit to the heater 52 for the tube 48 is broken at the contacts 124 and toggle 121, and the resultant cooling of the tube 48 will cause it to withdraw the lever 60 from the leaf spring 39, and as set forth above the switch will remain in open position. The operator will realize from the signal that the water is low in the boiler and after returning the water to the proper level the switch will be manually reset and the device will function as before.

Figure 5 discloses a system in which the liquid level responsive device is applied to a boiler and which on low water will not only cut-off the supply of heat to the boiler but will energize a feeder to introduce water to the boiler to restore the water to the normal level. In such a system it is desirable that the switch actuated by the liquid level responsive device be of the automatic return type so that it will reclose and put the system into normal operating condition after the water level has been restored. Therefore the stop 170 is provided to limit the movement of the toggle arm 121 in switch opening direction and in this position the spring 120 may be overcome by the leaf spring 39 when the lever 60 is withdrawn therefrom so that the force exerted by spring 39 will carry spring 120 back over-center with respect to support 122 and reclose the switch 121, 124, and 123.

In order for the liquid level responsive device to be responsive to the increase in liquid level the heater 52 must remain energized while the toggle switch 121 is in open position. In order to provide for this a third switch arm 171 is provided for actuation by the relay 130. This switch arm cooperates with an "out" contact 172. On low level the tube 48 expands and opens the toggle switch 121 deenergizing the relay coil 130 causing the switch arm 171 to engage contact 172. This causes a circuit to be closed from the supply conductor 145 through conductors 146, 173, contact 172, switch arm 171, conductor 174, balancing resistance 175, conductor 176, conductor 149, heater 52 and conductors 150 and 151 back to the other side of the supply line 152. The balancing resistance 175 is chosen so as to have a value which will provide for a flow of current through the heater 52 which is at least sufficient to maintain the tube 48 expanded sufficiently to keep toggle 121 in engagement with the stop 170 while the liquid level remains below the tube 48. In series with the signal circuit is a feeder 178 which controls the flow of water in the boiler and as set forth above, this circuit is energized through the switch arm 132 and the "out" contact 136 when the relay coil 130 is deenergized on low water.

As the water level rises due to the energization of the feeder 178 it will again surround the tube 48 causing it to dissipate its heat and contract thereby withdrawing the lever 60 from the leaf spring 39. As set forth above the leaf spring has sufficient strength to return the toggle switch 121 to closed position reenergizing the relay coil 130 and replacing it in series with the heater 52 instead of the balancing resistance 175. This will place the motor 142 again under the control of the condition responsive element 138 and the system will again be in normal running condition.

In order that the liquid level be normally a few inches above the level of the tube 48 a time delay mechanism may be introduced in combination with the feeder 178 so that it will run a predetermined length of time after the opening of the control circuit at 132, 136.

It will be appreciated of course that this system need not be used with all three controls but may be used with any one or any combination of them. It is obvious that this device could also be used to operate any other control anyone might desire to be actuated in accordance with liquid level. Also the device may be used as a liquid level controller independently of the boiler, that is, it may be inserted into any liquid container and through the feeder 178 control the liquid level.

Various changes and modifications of this invention may occur to those who are skilled in the art and I therefore wish it to be understood that I am to be limited only by the scope of the appended claims and not by the specific embodiments disclosed.

I claim as my invention:

1. Liquid level responsive means comprising a temperature responsive device mounted so as to have relatively good thermal conductivity between itself and a liquid when said liquid is at or above a predetermined level and relatively poor thermal conductivity between itself and said liquid when said liquid is below said predetermined level, means delivering a temperature changing medium to said device whereby its temperature is maintained at a value other than that of the liquid and varies as said liquid level rises above and falls below said predetermined level, and means compensating said device for variations in the temperature of said liquid to cause said device to function responsively substantially to liquid level only.

2. In a liquid level responsive means, in combination, a temperature responsive device comprising a metal of relatively high thermal expansion and a metal of relatively low thermal expansion, means mounting said device so as to have relatively good thermal conductivity between itself and a liquid when said liquid is at or above a predetermined level and relatively poor thermal conductivity between itself and said liquid when said liquid is below said predetermined level, means delivering a temperature changing medium to said device whereby its temperature is maintained at a value other than that of the liquid and varies as said liquid level rises above and falls below said predetermined level, a control member operated by the movement resulting from the unequal expansion and contraction of said metals, and means compensating said device for variations in temperature of said liquid whereby the resultant movement of said control member is dependent substantially upon liquid level only.

3. In a liquid level responsive means, in combination, a temperature responsive device comprising a tube of expansible material, means supporting one end of said tube, a force transmitting member of relatively non-expansible material connected to the other end of said tube, means mounting said device so as to have relatively good thermal conductivity between itself and a liquid when said liquid is at or above a predetermined level and relatively poor thermal conductivity between itself and said liquid when said liquid is below said predetermined level, means delivering a temperature changing medium to said device whereby its temperature is maintained at a value other than that of the liquid and varies as said liquid level rises above and falls below said predetermined level, a control member operated by said force transmitting member, and means for compensating said device for variations in liquid temperature whereby the resultant movement of said control member is substantially dependent upon liquid level only.

4. In combination, a container, liquid in said container, an expansible tube, means mounting said tube within said container at a predetermined level, a force transmitting element of relative non-expansible material connected to the inner end of said tube and extending longitudinally inside of said tube, said element having a hollow portion, an electric heater located within the hollow portion of said element, said element having holes in said hollow portion whereby heat may be radiated from said heater to said tube, and control means operated by said force transmitting element.

5. In combination, a container, liquid in said container, an expansible tube, means mounting said tube within said container at a predetermined level, a force transmitting element of relative non-expansible material connected to the inner end of said tube and extending longitudinally inside of said tube, an electric heating element mounted within said tube and radiating heat thereto, control means actuated by said force transmitting element, and thermally responsive means in series relationship with said tube and element for compensating them for changes in ambient temperature whereby said control means is moved responsively to the level of said liquid only.

6. In combination, a container, liquid in said container, an expansible tube, means mounting said tube within said container at a predetermined level, a force transmitting element of relative non-expansible material connected to the inner end of said tube and extending longitudinally inside of said tube, an electric heating element mounted within said tube and radiating heat thereto, control means actuated by said force transmitting element, and a member of relatively expansible material between said force transmitting element and said control means, said member expanding substantially the same amount as said tube on variations in ambient temperature whereby said control means is actuated independently of ambient temperature.

7. In combination, a container, liquid in said container, an expansible tube, means mounting said tube within said container at a predetermined level, a force transmitting element of relative non-expansible material connected to the inner end of said tube and extending longitudinally inside of said tube, a member of relatively expansible material adapted to expand the same amount as said tube on variations in ambient temperature, said element and said member being in tubular form and integrally joined at one end to make a continuous tube, an electric heater within said tube, and control means operated by said element and member.

8. In combination, a container, liquid in said container, an expansible tube, means mounting said tube within said container at a predetermined level, a force transmitting element of relative non-expansible material connected to the inner end of said tube and extending longitudinally inside of said tube, a member of relatively expansible material adapted to expand the same amount as said tube on variations in ambient temperature, said element and said member being in tubular form and integrally joined at one end to make a continuous tube, an electric heater within said element, said element having holes therein to facilitate the radiation of heat from said heater to said tube, and control means operated by said element and member.

9. In a liquid level responsive device, in combination, a control member, an actuator operatively connected thereto, a temperature responsive first member having good thermal conductivity to the liquid when in contact therewith and poor thermal conductivity when not in contact therewith, said first member being capable of impressing a force upon said actuator in one direction upon a temperature increase, a temperature responsive second member capable of impressing a force upon said actuator in the opposite direction upon a temperature increase, and means delivering a temperature changing medium to both of said temperature responsive members, said members because of thermal conductivity to the liquid being adapted to compensate each other for variations in liquid temperature whereby the resultant movement of said actuator is substantially dependent upon liquid level only.

10. Ambient temperature compensating means for a liquid level control including a member having good thermal conductivity when in contact with the liquid and poor thermal conductivity when not in contact therewith comprising, the combination of, force translating means, normally heated temperature responsive first means in thermal conductivity with the liquid capable of impressing a directional force upon said translating means for a given temperature variation, and temperature responsive second means in thermal conductivity with the liquid capable of impressing an oppositely directional force upon said translating means for a given temperature variation, whereby said second member compensates said first member for ambient temperature variations because of thermal conductivity to the liquid and causes said translating means to have a force impressed thereupon responsively substantially to liquid level only.

BERTRAM P. POND.